United States Patent [19]

Eckhardt

[11] Patent Number: 4,711,224
[45] Date of Patent: Dec. 8, 1987

[54] CHECK VALVE IN AUXILIARY VACUUM SYSTEM

[75] Inventor: Dennis C. Eckhardt, Saginaw, Mich.

[73] Assignee: General Motors Corporation, Detroit, Mich.

[21] Appl. No.: 902,663

[22] Filed: Sep. 2, 1986

[51] Int. Cl.4 .............................................. F02B 25/06
[52] U.S. Cl. ...................................... 123/572; 137/854
[58] Field of Search ................ 137/839, 908; 123/572, 123/41.86, 198 C, 198 P, 65 BA

[56] References Cited

U.S. PATENT DOCUMENTS

| | | | |
|---|---|---|---|
| 3,610,273 | 10/1971 | Russell | 137/854 |
| 4,012,183 | 3/1977 | Calabretta | 418/266 |
| 4,066,055 | 1/1978 | Hager | 123/572 |
| 4,162,662 | 7/1979 | Melchior | 123/198 P |
| 4,513,784 | 4/1985 | Farrand et al. | 137/854 |
| 4,550,749 | 11/1985 | Krikorian | 137/854 |
| 4,610,275 | 9/1986 | Beecher | 137/854 |

*Primary Examiner*—Craig R. Feinberg
*Assistant Examiner*—Marguerite Macy
*Attorney, Agent, or Firm*—Saul Schwartz

[57] ABSTRACT

A check valve for disposition between a vacuum operated device and the intake of an auxiliary vacuum pump of an automobile which discharges into the crankcase of the engine of the vehicle. The check valve includes an elastomeric umbrella valve having a flexible lip which is self-biased to a closed position preventing backflow of air to the vacuum operated device and which is flexed to a normal open position by a pressure difference corresponding to pump operation with the integrity of the auxiliary vacuum system intact. A larger pressure difference corresponding to operation of the vacuum pump with the integrity of the auxiliary vacuum system breached flexes the lip of the umbrella valve to a control open position wherein airflow is restricted to only a control orifice of the valve the flow area of which orifice is predetermined to limit airflow to less than the rate at which air is scavenged from the crankcase of the engine.

3 Claims, 3 Drawing Figures

CHECK VALVE IN AUXILIARY VACUUM SYSTEM

BACKGROUND OF THE INVENTION

1. Field of the Invention

This invention relates generally to auxiliary vacuum systems for automobiles and, more particularly, to a check valve for controlling the airflow rate through a pump of the auxiliary system.

2. Description of the Prior Art

Auxiliary vacuum systems on some automobiles include engine driven, vane type vacuum pumps which exhaust a mixture of air and lubricating oil into the crankcase of the engine of the vehicle. As long as the integrity of the vacuum system is maintained, the discharge flow rate of the vacuum pump does not exceed the rate at which air in the crankcase is scavenged by the crankcase ventilation system. If the vacuum system integrity is breached, as when a hose upstream of the vacuum pump separates, the discharge of the vacuum pump could exceed the crankcase ventilation scavenge rate and thus pressurize the crankcase. A check valve according to this invention operates when the integrity of the vacuum system is breached to limit the vacuum pump discharge to a level compatible with the crankcase ventilation capacity.

SUMMARY OF THE INVENTION

This invention is a new and improved check valve in an auxiliary vacuum pump system of an automobile. The new and improved check valve includes a valve chamber between the intake of an auxiliary engine driven vacuum pump and a vacuum operated device on the vehicle, an inlet port in the valve chamber between the latter to the vacuum operated device, an outlet port in the valve chamber between the latter and the vacuum pump intake, a control orifice in the valve chamber between the latter and the vacuum pump intake, and a valve element in the valve chamber biased to a closed position closing the inlet port to prevent reverse airflow to the vacuum operated device. When the integrity of the vacuum system is intact, a normal pressure difference across the valve element moves the latter to a normal open position exposing the inlet port to the outlet port so that air in the vacuum operated device is evacuated by the vacuum pump and discharged into the crankcase. When the integrity of the vacuum system is breached, the pressure difference across the valve element almost instantaneously increases to well above the normal pressure difference and moves the valve element from the normal open position to a control open position wherein the outlet port is closed and only the control orifice is open to the inlet port so that only enough air is admitted to the vacuum pump intake to maintain pump lubrication without the pump discharge exceeding the crankcase ventilation capacity. In a preferred embodiment, the valve element is an elastomeric umbrella valve with an integral flexible lip which is self-biased to the closed position covering the inlet port and which deflects from the closed to the normal open and to the control open positions as the pressure difference across the lip increases.

THE PREFERRED EMBODIMENT

Figure 1:
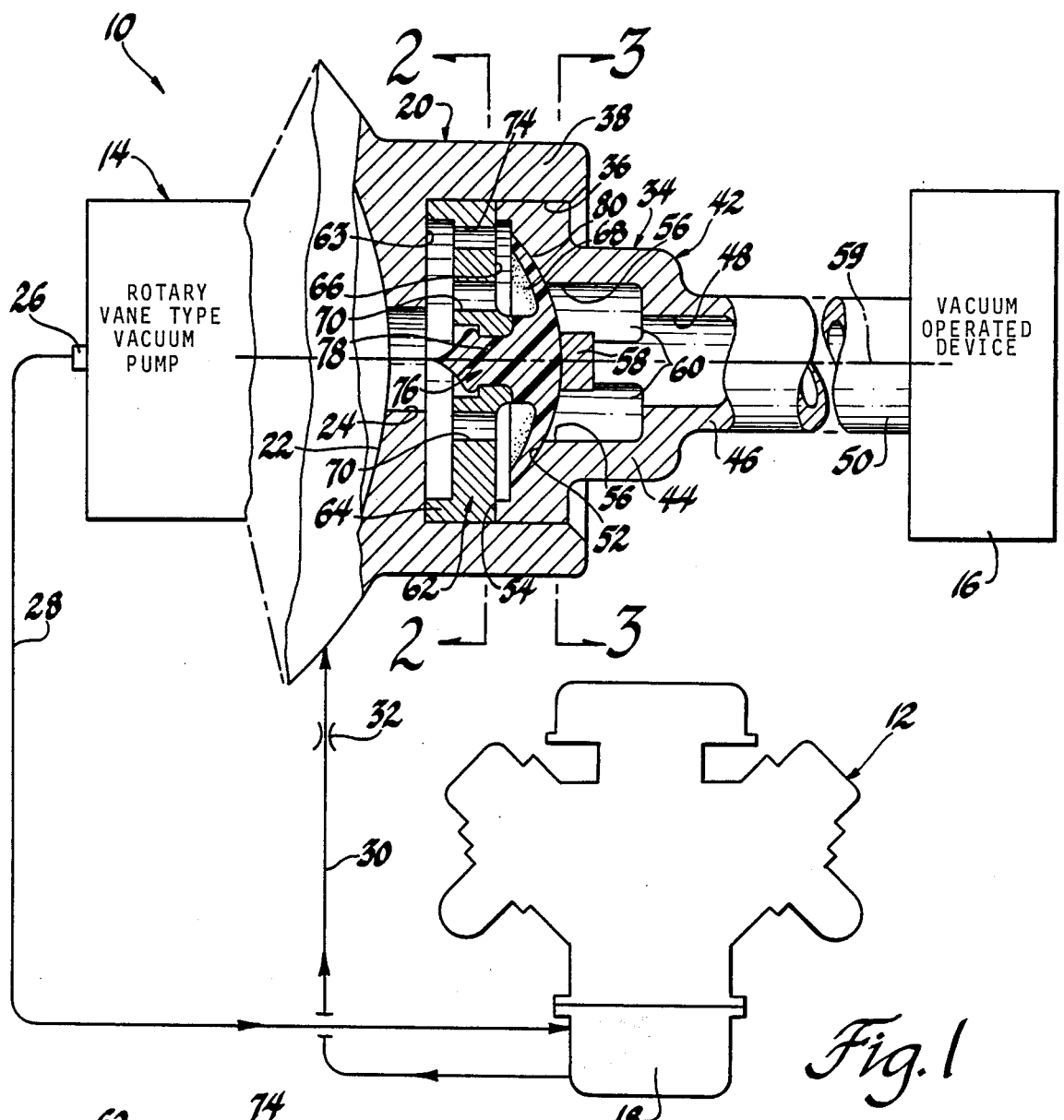
FIG. 1 is a schematic illustration of an auxiliary vacuum system including a check valve according to this invention and showing the check valve in longitudinal sectional view.

Referring now to FIG. 1 of the drawings, a schematically illustrated auxiliary vacuum system 10 of an automotive vehicle is associated with an internal combustion engine 12 of the vehicle and includes a rotary vane type vacuum pump 14 driven by the engine and a vacuum operated device 16. The engine 12 has a crankcase oil sump 18 the volume of which above the oil pool is scavenged by a crankcase ventilation system, not shown, which draws air at a controlled rate from the crankcase for combustion in the combustion chambers of the engine.

The schematically illustrated vacuum pump 14 is a typical vane-type unit and includes a housing 20 having an internal cylindrical wall 22 forming the outer boundary of the pumping chambers. Radial vanes, not shown, rotating in the housing bear against the wall 22 and define the remainder of a plurality of rotating, variable volume chambers which draw air in at a schematically illustrated intake 24 in the housing and exhaust air at a discharge 26. The discharge 26 is connected by a duct 28 to the crankcase 18 above the oil pool. The vacuum within the pump 14 draws pump lubrication oil from the crankcase through a tube 30 having a flow control restriction 32 therein. The oil is returned to the sump with discharge air from the pump through duct 28. A check valve 34 according to this invention is disposed in a cylindrical bore 36 in an annular boss 38 of the housing 20 between the intake 24 of the vacuum pump and the vacuum operated device 16.

Figure 3:
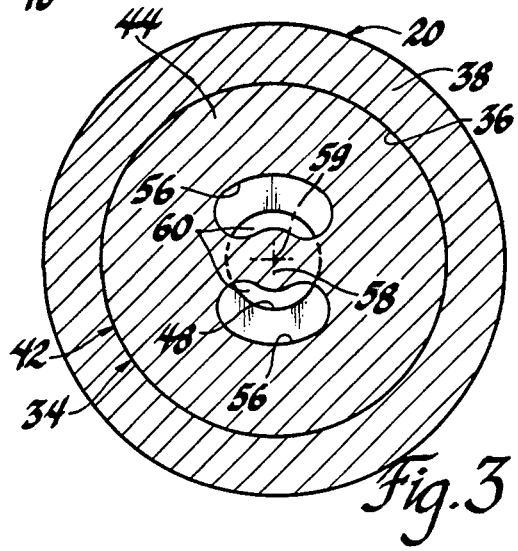
FIG. 3 is a sectional view taken generally along the plane indicated by lines 3—3 in FIG. 1.

The check valve 34 includes a first valve insert 42 having a cylindrical body portion 44 and integral tubular stem portion 46. The stem portion 46 has an internal bore 48 therethrough which is in fluid communication with the vacuum operated device 16 through a vacuum duct 50. As seen best in FIG. 1, a cavity in the end of body portion 44 opposite the tubular stem portion 46 is bounded by a spherical wall 52 and by a raised annular land 54 around the spherical wall portion. A pair of arcuate inlet ports 56, FIG. 3, are formed in the spherical wall 52 on opposite sides of a cross member 58 of the body portion 44 and symmetrically about a longitudinal axis 59 of the bore 36. The inlet ports 56 communicate with the internal bore 48 of the stem portion 46 through a pair of connecting chambers 60 in the body portion 44.

The check valve 34 further includes a disc shaped second valve insert 62 disposed in the bore 36 between the annular land 54 on the first valve insert 42 and an end surface 63 of the bore 36. The second valve insert has an annular land 64 abutting the bottom surface 63 and a circular flat surface 66 facing the spherical wall 52 of the first valve insert. The flat surface 66 and the spherical wall 52 cooperate in defining therebetween a valve chamber 68 in communication with the bore 48 through inlet ports 56.

Figure 2:
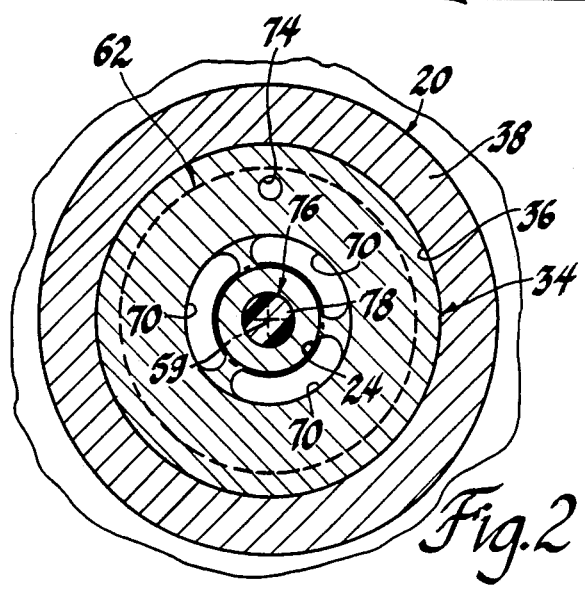
FIG. 2 is a sectional view taken generally along the plane indicated by lines 2—2 in FIG. 1.

The second valve insert 62 has three arcuate outlet ports 70, FIG. 2, therethrough arranged in a circle about the longitudinal axis 59. The combined flow areas of the outlet ports 70 is sufficiently large to avoid any significant pressure drop across the second valve insert 62. The second valve insert 62 further includes a control orifice 74 radially outboard of the circle containing the outlet ports 70. The cross sectional flow area of the control orifice 74 is substantially smaller than the combined flow areas of the outlet ports 70 and is predetermined to permit passage of air at a predetermined flow rate less than rate at which air is scavenged from the crankcase. The valve chamber 68 communicates with the intake 24 of the vacuum pump through the outlet ports 70 and the control orifice 74 and through the volume defined within the annular land 64 of the second valve insert.

A valve element 76 in the form of a resilient, elastomeric umbrella valve is disposed in the valve chamber 68 and includes a stem 78 aligned on the axis 59 and pressed into an appropriate retaining aperture in the second valve insert 62 whereby the umbrella valve is mounted on the second valve insert. The umbrella valve further includes a generally spherical sealing lip 80 self-biased to a closed position, FIG. 1, abutting the spherical wall 52 of the first valve insert and closing the inlet ports 56.

In the closed position of the valve element, negative airflow from the valve chamber 68 to the vacuum operated device 16 is prevented. In the presence of a pressure difference across the spherical sealing lip 80 corresponding to normal operation of the pump 14 with the vacuum system intact, the spherical lip is deformed or flexed inwardly to a normal open position, not shown, wherein the outlet ports 70 and the control orifice 74 are in fluid communication with the inlet ports. In the presence of a larger pressure difference across the sealing lip 80 corresponding to the pressure difference which would exist at normal pump speed with the integrity of the vacuum system breached upstream of the check valve 34, the spherical lip 80 is further flexed toward the second valve insert 62 until the lip engages the flat surface 66 in a control open position of the valve element, not shown, radially outboard of the outlet ports 70. In the control open position of the valve element, airflow from the inlet ports 56 to the pump intake 24 is restricted to the control orifice 74 which, as described above, limits the airflow rate to less than the scavenge airflow rate from the crankcase so that pressurization of the crankcase is avoided.

The embodiments of the invention in which an exclusive property or privilege is claimed are defined as follows:

1. In an auxiliary vacuum system of an automotive vehicle having a vacuum operated device and an internal combustion engine with a crankcase scavenged at a predetermined airflow rate by a crankcase ventilation system of said engine,
   said auxiliary vacuum system including
   a rotary vane type vacuum pump having an intake and an exhaust,
   a first duct between said vacuum pump intake and said vacuum operated device whereby air is exhausted from said vacuum operated device at a normal airflow rate less than said predetermined scavenge airflow rate, and
   a second duct between said vacuum pump exhaust and said engine crankcase whereby air is discharged from said vacuum pump into said crankcase,
   in said auxiliary vacuum system, a check valve comprising:
   means defining a valve chamber connected to said first duct and to said vacuum pump intake,
   means defining an inlet port between said valve chamber and said first duct,
   means defining an outlet port between said valve chamber and said vacuum pump intake,
   means defining a control orifice between said valve chamber and said vacuum pump intake having a flow area substantially less than the flow area of said outlet port and predetermined to limit airflow therethrough to less than said predetermined scavenge airflow rate,
   a valve element,
   means mounting said valve element in said valve chamber for movement between a closed position covering said inlet port to prevent backflow of air to said vacuum operated device and a normal open position permitting airflow to said vacuum pump intake through both said control orifice said outlet port and a control open position closing said outlet port and limiting airflow to said vacuum pump to only said control orifice, and
   means biasing said valve element to said closed position,
   a normal pressure difference across said valve element corresponding to operation of said vacuum pump with the integrity of said vacuum system intact being operative to move said valve element from said closed to said normal open position and a larger pressure difference across said valve element corresponding to operation of said vacuum pump with the integrity of said auxiliary vacuum system breached being operative to move said valve element to said control open position thereby to limit the flow rate of air through said vacuum pump to less than said predetermined scavenge airflow rate.

2. In an auxiliary vacuum system of an automotive vehicle having a vacuum operated device and an internal combustion engine with a crankcase scavenged at a predetermined airflow rate by a crankcase ventilation system of said engine,
   said auxiliary vacuum system including
   a rotary vane type vacuum pump having an intake and an exhaust,
   a first duct between said vacuum pump intake and said vacuum operated device whereby air is exhausted from said vacuum operated device at a normal airflow rate less than said predetermined scavenge airflow rate, and
   a second duct between said vacuum pump exhaust and said engine crankcase whereby air is discharged from said vacuum pump into said crankcase,
   in said auxiliary vacuum system, a check valve comprising:
   means defining a valve chamber connected to said first duct and to said vacuum pump intake and including a spherical wall portion and a flat wall portion,
   means defining an inlet port in said spherical wall portion between said valve chamber and said first duct,
   means defining an outlet port in said flat wall portion between said valve chamber and said vacuum pump intake,
   means defining a control orifice in said flat wall portion between said valve chamber and said vacuum pump intake having a flow area substantially less than the flow area of said outlet port and predetermined to limit airflow therethrough to less than said predetermined scavenge airflow rate, an elastomeric umbrella valve having a flexible spherical lip, and means mounting said umbrella valve in said valve chamber with said flexible spherical lip self-biased to a closed position covering said inlet port to prevent backflow of air to said vacuum operated device and flexible to a normal open position permitting airflow to said vacuum pump intake through both said control orifice said outlet port and to a control open position closing said outlet port and limiting airflow to said vacuum pump to only said control orifice, a normal pressure difference across said flexible spherical lip corresponding to operation of said vacuum pump with the integrity of said auxiliary vacuum system intact being operative to flex said flexible spherical lip from said closed to said normal open position and a larger pressure difference across said flexible spherical lip corresponding to operation of said vacuum pump with the integrity of said auxiliary vacuum system breached being operative to flex said flexible spherical lip to said control open position thereby to limit the flow rate of air through said vacuum pump to less than said predetermined scavenge airflow rate.

3. In an auxiliary vacuum system of an automotive vehicle having a vacuum operated device and an internal combustion engine with a crankcase scavenged at a predetermined airflow rate by a crankcase ventilation system of said engine, said auxiliary vacuum system including a rotary vane type vacuum pump having a housing defining an intake and an exhaust, a first duct between said vacuum pump intake and said vacuum operated device whereby air is exhausted from said vacuum operated device at a normal airflow rate less than said predetermined scavenge airflow rate, and a second duct between said vacuum pump exhaust and said engine crankcase whereby air is discharged from said vacuum pump into said crankcase, in said auxiliary vacuum system, a check valve comprising:

means on said vacuum pump housing defining a valve bore having a bottom surface with a connection therethrough to said vacuum pump intake, a first valve insert disposed in said valve bore and including a tubular stem portion with a bore therein connected to said first duct and a spherical wall portion facing said bottom surface of said bore, a second valve insert disposed in said valve bore between said first valve insert and said bottom surface of said bore and including a flat wall portion cooperating with said spherical wall portion in defining therebetween a valve chamber, means defining an inlet port in said spherical wall portion between said valve chamber and said bore in said stem portion whereby said valve chamber is connected to said first duct, means defining an outlet port in said flat wall portion between said valve chamber said bottom surface of said bore whereby said valve chamber is connected to said vacuum pump intake, means defining a control orifice in said flat wall portion between said valve chamber and said bottom surface of said bore having a flow area substantially less than the flow area of said outlet port and predetermined to limit airflow therethrough to less than said predetermined scavenge airflow rate, an elastomeric umbrella valve having a flexible spherical lip and an integral base, and means mounting said integral base of said umbrella valve on said second valve insert with said flexible spherical lip self-biased to a closed position covering said inlet port to prevent backflow of air to said vacuum operated device and flexible to a normal open position permitting airflow to said vacuum pump intake through both said control orifice said outlet port and to a control open position closing said outlet port and limiting airflow to said vacuum pump to only said control orifice, a normal pressure difference across said flexible spherical lip corresponding to operation of said vacuum pump with the integrity of said auxiliary vacuum system intact being operative to flex said flexible spherical lip from said closed to said normal open position and a larger pressure difference across said flexible lip corresponding to operation of said vacuum pump with the integrity of said auxiliary vacuum system breached being operative to flex said flexible spherical lip to said control open position thereby to limit the flow rate of air through said vacuum pump to less than said predetermined scavenge airflow rate.

* * * * *